United States Patent [19]

Yakuwa et al.

[11] Patent Number: 4,892,077
[45] Date of Patent: Jan. 9, 1990

[54] FUEL INJECTION CONTROL METHOD FOR INTERNAL COMBUSTION ENGINES

[75] Inventors: Masahiko Yakuwa, Wako; Kikuo Tomozawa; Kazuya Kishi, both of Minato, Japan

[73] Assignee: Honda Giken Kogyo Kabushiki Kaisha, Tokyo, Japan

[21] Appl. No.: 193,419

[22] Filed: May 12, 1988

[30] Foreign Application Priority Data

May 12, 1987 [JP] Japan .................. 62-115539

[51] Int. Cl.$^4$ .............................. F02D 41/20
[52] U.S. Cl. ...................... 123/487; 123/480
[58] Field of Search ............... 123/480, 487, 490, 478; 364/431.05

[56] References Cited

U.S. PATENT DOCUMENTS

| | | | |
|---|---|---|---|
| 4,250,858 | 2/1981 | Jeenicke et al. | 123/487 X |
| 4,581,703 | 4/1986 | Bassi et al. | 123/480 X |
| 4,617,899 | 10/1986 | Nakajima | 123/487 |

FOREIGN PATENT DOCUMENTS 45662 5/1974 Japan .

Primary Examiner—Tony M. Argenbright
Attorney, Agent, or Firm—Lyon & Lyon

[57] ABSTRACT

Fuel injection is started through a first one of fuel injection valves, and a time counter counts a period of time elapsed from the start of fuel injection through the first one valve. Fuel injection is started through a second one of the fuel injection valves when a predetermined period of time elapses after the start of fuel injection through the first one valve. The fuel injection through the first one valve is terminated in response to completion of counting of the time counter, and the time counter is restarted to count a difference between a desired fuel injection period of time for the first one valve and a desired fuel injection period of time for the second one valve. The fuel injection through the second one valve is terminated in response to completion of counting of the restarted time counter.

7 Claims, 6 Drawing Sheets

FUEL INJECTION CONTROL METHOD FOR INTERNAL COMBUSTION ENGINES

BACKGROUND OF THE INVENTION

This invention relates to a method of controlling injection of fuel supplied to an internal combustion engine having multi cylinders, and more particularly to a method of controlling simultaneous injection by fuel injection valves arranged for respective cylinders of the engine by means of a single time counter.

In an internal combustion engine provided with a plurality of cylinders and fuel injection valves corresponding to respective cylinders, in general, the amount of fuel supplied to the engine is controlled by adjusting fuel injection periods of time for which the fuel injection valves are energized or opened to inject fuel. The fuel injection periods of time for the fuel injection valves are measured by as many time counters which are provided for respective fuel injection valves. However, if the fuel injection periods of all the fuel injection valves can be measured by only one time counter, it would be possible to manufacture the fuel supply control system at low cost due to a lesser number of time counters.

When the engine is not in a particular operating condition such as a high speed condition and a high load condition, it would be possible to effect sequential injection through the respective fuel injection valves by sequentially measuring the respective fuel injection periods by the single time counter.

On the other hand, when the engine is in the particular operating condition, it is desirable to effect simultaneous injection through the fuel injection valves in order to secure a required fuel injection period of time and hence a desired fuel injection quantity.

In order to control such simultaneous fuel injection by means of a single time counter, a method is known e.g. from Japanese Provisional Patent Publication (Kokai) No. 49-45652, in which fuel injection valves are simultaneously controlled to open and close for simultaneous injection in accordance with a single fuel injection period signal common to all the fuel injection valves, supplied from a calculation circuit which corresponds to the time counter. Therefore, according to the known method, the fuel injection valves are opened and closed at the same time, whereby it is impossible to set different fuel injection periods for the respective fuel injection valves. However, the charging efficiency is different between the cylinders of the engine due to variations in air distribution characteristic in the intake air system, variations in tappet clearance between respective intake valves and exhaust valves, etc., and therefore there can occur variation in the air/fuel ratio of an air-fuel mixture supplied to the respective cylinders if the single fuel injection period is commonly set for all the cylinders according to the known method, resulting degraded emission characteristics, etc. This makes it difficult for a fuel injection system with a single time counter to find a practical use in spite of its low cost.

SUMMARY OF THE INVENTION

It is therefore the object of the invention to provide a fuel injection control method for internal combustion engines, which is capable of controlling the fuel injection periods of respective fuel injection valves to different values even for simultaneous injection by means of a single time counter, to thereby enable a fuel supply control system according to the method of the invention to be manufactured at low cost.

To attain the above object, the present invention provides a fuel injection control method for an internal combustion engine having a plurality of cylinders, and a plurality of fuel injection valves associated, respectively, with the cylinders, wherein fuel injection is started through each of the fuel injection valves while a period of time elapsed from the start of fuel injection is counted by time counting means, and the fuel injection through each of the fuel injection valves is terminated in response to completion of counting of the time counting means.

The method is characterized by comprising the following steps:

(1) starting fuel injection through a first one of the fuel injection valves, and at the same time causing the time counting means to count a period of time elapsed from the start of fuel injection through the first one fuel injection valve;

(2) starting fuel injection through a second one of the fuel injection valves when a predetermined period of time elapses after the start of fuel injection through the first one fuel injection valve;

(3) terminating the fuel injection through the first one fuel injection valve in response to completion of counting of the time counting means started in the step (1), and at the same time setting a difference between a desired fuel injection period of time for the first one fuel injection valve and a desired fuel injection period of time for the second one fuel injection valve and restarting the time counting means to count the difference; and (4) terminating the fuel injection through the second one fuel injection valve in response to completion of counting of the time counting means restarted in the step (3).

Preferably, the time counting means comprises a single time counter.

Further preferably, in the step (3) the fuel injection through the first one fuel injection valve is terminated when a second predetermined period of time has elapsed after the completion of counting of the time counting means.

Also preferably, in the step (4) the fuel injection through the second one fuel injection valve is terminated when a second predetermined period of time has elapsed after the completion of counting of the time counting means restarted in the step (3).

The second predetermined period of time should be longer than a predetermined interrupt inhibiting period of time during which execution of fuel injection control is inhibited.

Further preferably, the second predetermined period of time is equal to the first-mentioned predetermined period of time.

The above and other objects, features, and advantages of the invention will be more apparent from the ensuing detailed description taken in conjunction with the accompanying drawings.

DETAILED DESCRIPTION

The method of the invention will now be described in detail with reference to the drawings showing an embodiment thereof.

Figure 1:
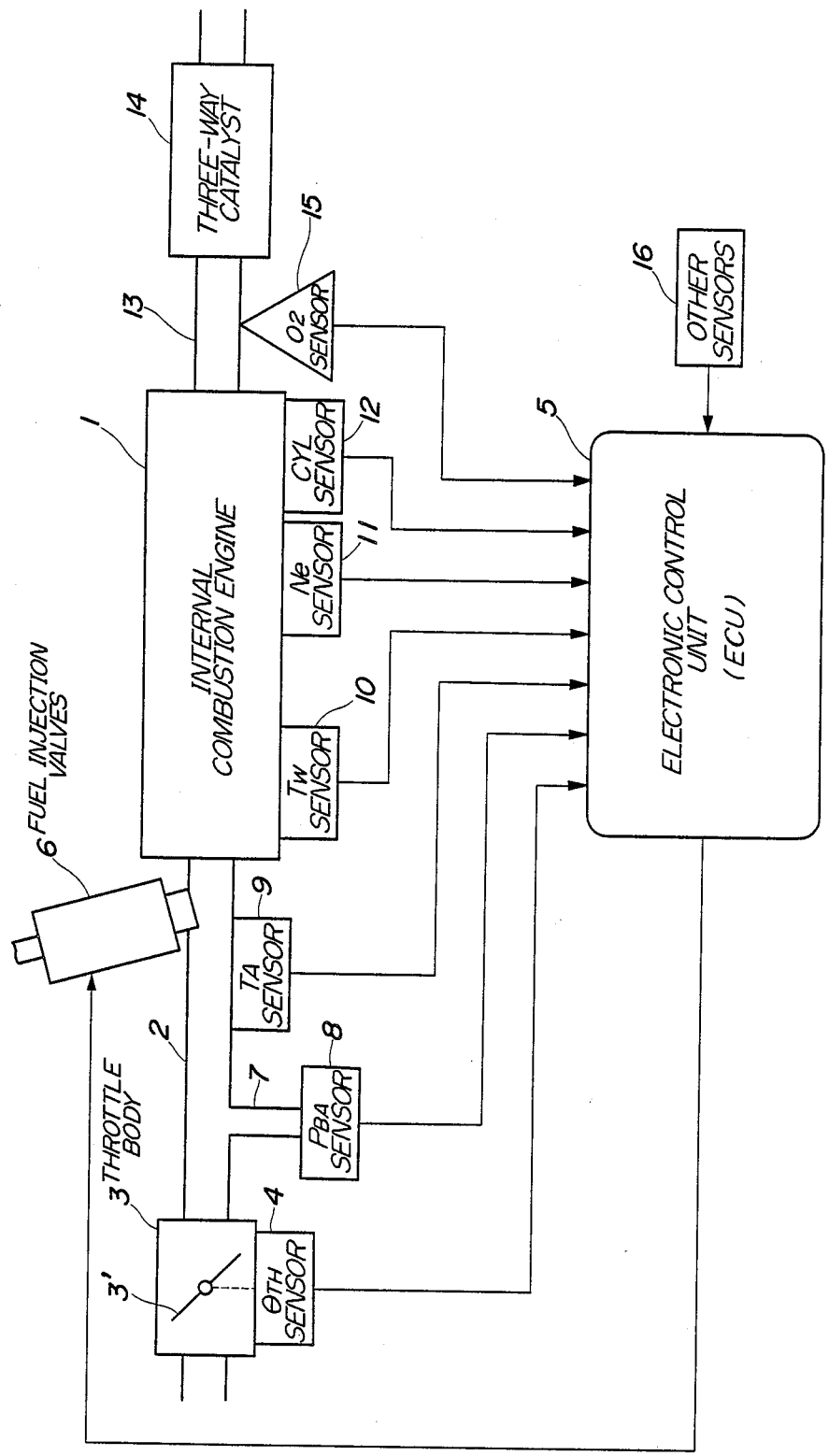
FIG. 1 is a schematic block diagram showing the overall construction of a fuel supply control system to which is applied the method according to the invention.

Referring first to FIG. 1, there is illustrated a fuel supply control system to which is applied the method of the invention. In the figure, reference numeral 1 designates an internal combustion engine with three cylinders. An intake pipe 2 is connected to the cylinder block of the engine. A throttle body 3 with a throttle valve 3' therein is arranged across the intake pipe 2. Connected to the throttle valve 3' is a throttle valve opening ($\theta$th) sensor 4, which detects the throttle valve opening $\theta$th, converts same into an electric signal, and supplies the electric signal to an electronic control unit (hereinafter called "the ECU") 5.

Fuel injection valves (hereinafter called "the injectors") 6, one of which is shown, are each arranged in the intake pipe 2 at locations slightly upstream of the engine 1 between the engine 1 and the throttle body 3 for the respective cylinders of the engine 1. Each of the injectors 6 is connected to a fuel pump, not shown, and also electrically connected to the ECU 5 to have its valve opening period $T_{OUT}$ controlled by a driving signal from the ECU 5.

On the other hand, an absolute pressure ($P_{BA}$) sensor 8 is connected to the intake pipe 2 through a conduit 7 at a location immediately downstream of the throttle valve 3' of the throttle body 3, which detects the absolute pressure $P_{BA}$, converts same into an electric signal, and supplies the electric signal to the ECU 5.

Further, an intake air temperature (TA) sensor 9 is inserted in the intake pipe 2 at a location downstream of the absolute pressure sensor 8 between the conduit 7 and the injectors 6, to detect the temperature of intake air delivered to the engine through the intake pipe 2, convert the detected intake air temperature into an electrical signal, and supply same to the ECU5.

Mounted on the cylinder block of the engine 1 is an engine coolant temperature ($T_W$) sensor 10 formed of a thermistor or the like, which is embedded in a peripheral wall of a cylinder filled with coolant and senses the engine coolant temperature $T_W$ as a temperature representative of the engine temperature and supplies an electrically converted signal to the ECU 5.

An engine rotational speed (Ne) sensor 11 and a cylinder-discriminating (CYL) sensor 12 are arranged in facing relation to a camshaft of the engine or a crankshaft of same, neither of which is shown. The sensor 11 is adapted to generate a pulse as a top-dead-center (TDC) signal at one of predetermined crank angles each in advance of the top dead center position at the start of suction stroke of each cylinder whenever the crankshaft of the engine rotates through 240 degrees, and delivers the TDC signal to the ECU 5. The sensor 12 is adapted to generate a pulse as a cylinder-discriminating (CYL) signal at a predetermined crank angle of a particular cylinder, and delivers the CYL signal to the ECU 5.

A three-way catalytic converter 14 is arranged in an exhaust pipe 13 extending from the cylinder block of the engine 1, for purifying toxic components, i.e. HC, CO, and NOx in the exhaust gases. An $O_2$ sensor 15 as an exhaust component concentration sensor is arranged in the exhaust pipe 13 at a location upstream of the three-way catalytic converter 14. The $O_2$ sensor 15 senses the concentration of oxygen in the exhaust gases and delivers an electric signal having a voltage dependent upon the sensed oxygen concentration to the ECU 5.

Further, connected to the ECU 5 are other sensors 16 for sensing respective other operating parameters of the engine 1 such as atmospheric pressure and the voltage of a battery supplying electric power to the ECU 5, etc., which detect the other operating parameters and supply electrically converted signals to the ECU 5.

The ECU 5 operates in response to the output signals from the above-mentioned various operating parameter sensors, to determine operating conditions of the engine or operating regions in which the engine is operating, such as a fuel-cut affecting region, an accelerating region, and a decelerating region, and then to calculate the fuel injection period TOUT for which the injectors 6 should be opened, in accordance with the determined operating conditions or regions of the engine and in synchronism with generation of pulses of the TDC signal, by the use of the following equation:

$$T_{OUT} = T_i \times K_1 + K_2 \quad (1)$$

where $T_i$ represents a basic fuel injection period or valve opening period for the injectors 6, and is read from a map stored in memory means, hereinafter referred to, within the ECU 5 as a function of absolute pressure $P_{BA}$ within the intake pipe and the engine rotational speed Ne, for instance. $K_1$ and $K_2$ are correction coefficients and correction variables, respectively, which are set, in response to operating conditions or regions of the engine determined from output signals from the operating parameter sensors, to optimal values for various operating characteristics of the engine such as start ability, emission characteristics, fuel consumption, and engine accelerability.

The ECU 5 supplies the injectors 6 with driving signals corresponding to the fuel injection period TOUT calculated as above to open same over the period TOUT.

Figure 2:
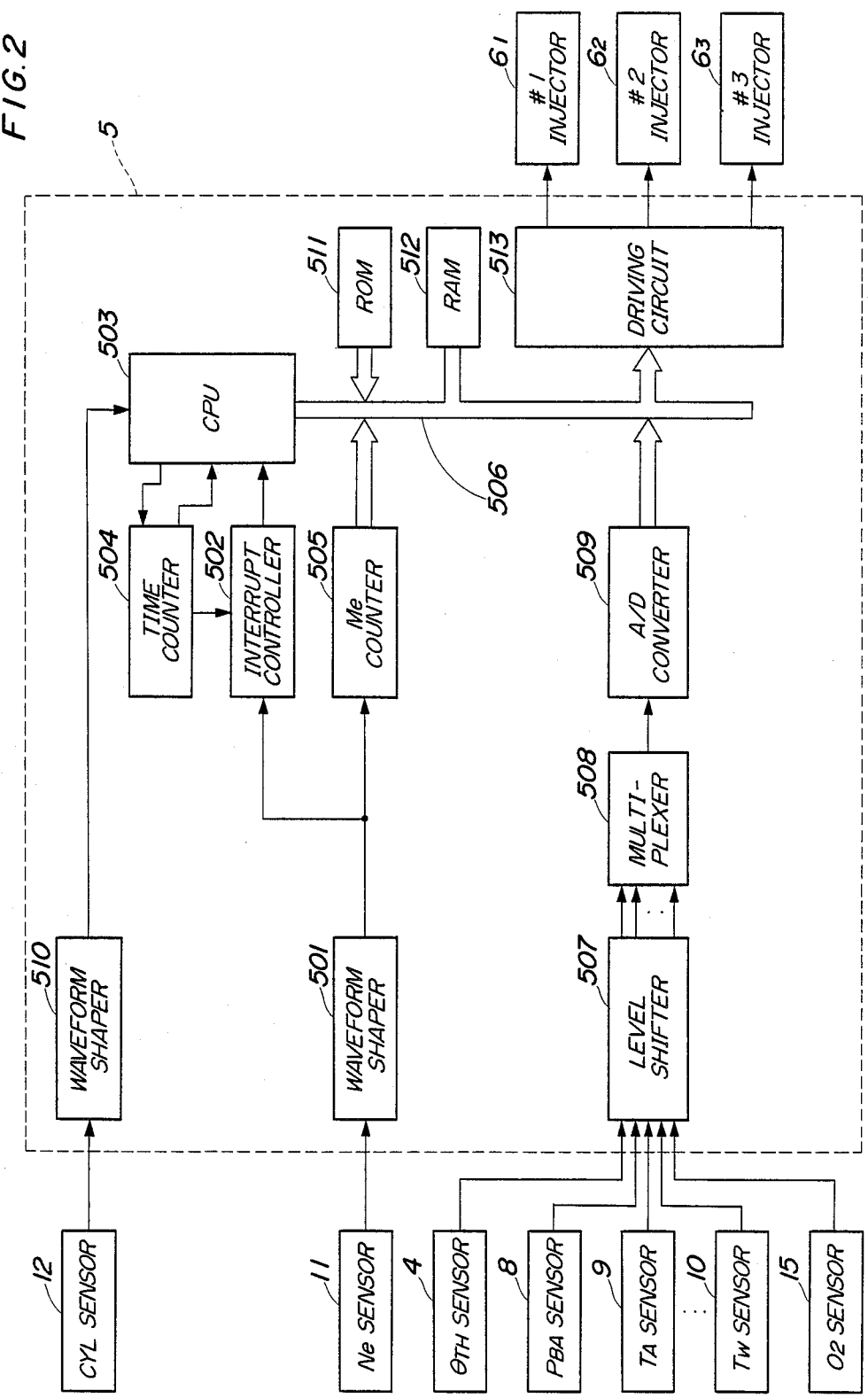
FIG. 2 is a schematic block diagram showing the internal construction of an electronic control unit appearing in FIG. 1.

FIG. 2 shows the internal arrangement of the ECU 5 in FIG. 1. An output signal from the engine rotational speed sensor 11 has its waveform shaped by a waveform shaper circuit 501, and the shaped signal is then delivered to a central processing unit (hereinafter called "the CPU") 503 as TDC signal pulses, through an interrupt control circuit 502.

Connected to the interrupt control circuit 502 is a time counter 504 which is controlled by the CPU 503 and comprises an up counter of which the count increases with every application of a clock pulse and thereafter overflows after it has reached a predetermined overflow value thereof. The time counter 504 supplies its counted value to the interrupt control circuit 502 and the CPU 503. The interrupt control circuit 502 supplies an interrupt signal to the CPU 503 when the time counter 504 has counted up. Further, the time counter 504 automatically has its counted value reset to 0 and again starts counting immediately upon counting up, unless it is stopped from operating.

Also connected to the waveform shaper circuit 501 is an Me counter 505 which measures the time interval between an immediately preceding pulse of the TDC signal and a present one thereof, and outputs a counted value Me which is proportional to the reciprocal of the actual engine rotational speed Ne. The counted value Me from the Me counter 505 is delivered to the CPU 503 via a data bus 506.

On the other hand, output signals from various sensors such as the throttle valve opening sensor 4, the intake pipe absolute pressure sensor 8, and the $O_2$ sensor are each shifted to a predetermined voltage level by a level shifter unit 507, and the level-shifted signals are successively delivered, by means of a multiplexer 508, to an A/D converter 509, which in turn converts the analog or output signals from the sensors into respective corresponding digital signals, and delivers them to the CPU 503 via the data bus 506.

The CYL signal from the CYL sensor 12 has its waveform shaped by a waveform shaper circuit 510, and the shaped signal is then delivered to the CPU 503 as CYL signal pulses.

Further connected to the CPU 503 are a read-only memory (ROM) 511, a random access memory (RAM) 512, and a driving circuit 513. The ROM 511 stores control programs to be executed by the CPU 503 and various data such as maps and tables for determining the basic fuel injection value $T_i$ and correction coefficients and correction variables, etc. The RAM 512 temporarily stores results of various calculations executed by the CPU 503.

The CPU 503 executes a control program stored within the ROM 511 to read from the ROM 511 values of correction coefficients and correction variables as well as the $T_i$ value in response to the output signals from the operating parameter sensors to calculate the valve opening period $T_{OUT}$ for the injectors 6 based on the above-mentioned equation (1), and to set the time counter 504 to a set value Tset dependent upon the calculated valve opening period $T_{OUT}$ and then make the time counter 504 start counting, and further to supply the driving circuit 513 with control signals for opening the injectors 6, i.e. #1–#3 injectors $6_1$–$6_3$ for respective #1–#3 cylinders, at predetermined time intervals in the mentioned order.

Although according to the embodiment three cylinders, i.e. #1–#3 cylinders, are provided, the invention may be also applied to multicylinder internal combustion engines having other numbers of cylinders.

Figure 5:
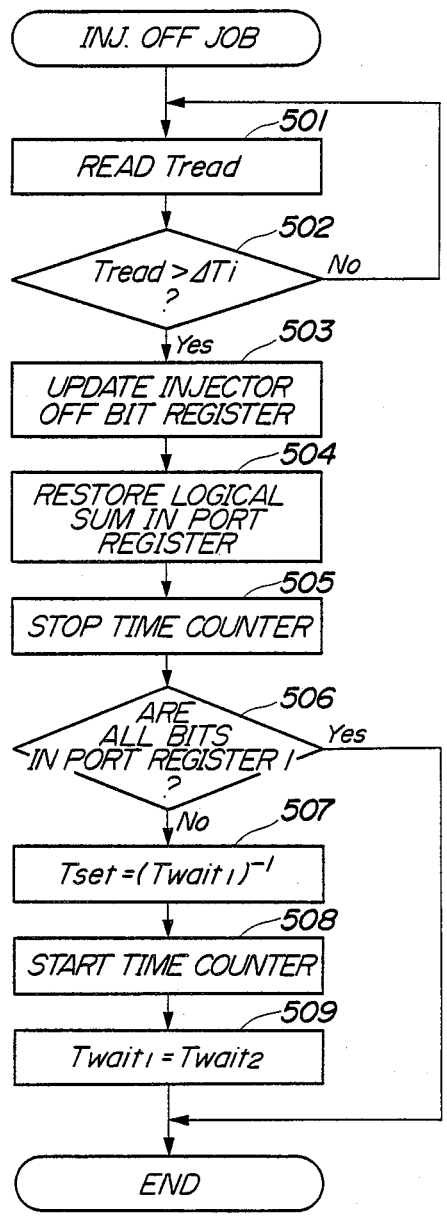
FIG. 5 is a flowchart of a control program for controlling the termination of fuel injection by the fuel injection valves according to the invention.

Further, if the interrupt signal which is supplied from the interrupt control circuit 502 when the count of the time counter 504 has counted up is supplied to the CPU 503 within a predetermined interrupt inhibiting time interval (hereinafter called "the interrupt inhibit interval") which is provided in order to give priority to another processing executed in the CPU, an interrupt processing, which will be later described by referring to FIG. 5, is started upon termination of the interrupt inhibit interval in the CPU 503. In this interrupt processing, one injector to stop injecting is discriminated or selected from among currently injecting injectors 6, and then a control signal for closing the discriminated injector is supplied to the driving circuit 513. The driving circuit 513 continues to supply the corresponding injector with the driving signal for opening same from the moment the control signal for opening is applied thereto to the moment the signal for closing is applied thereto.

Figure 3:
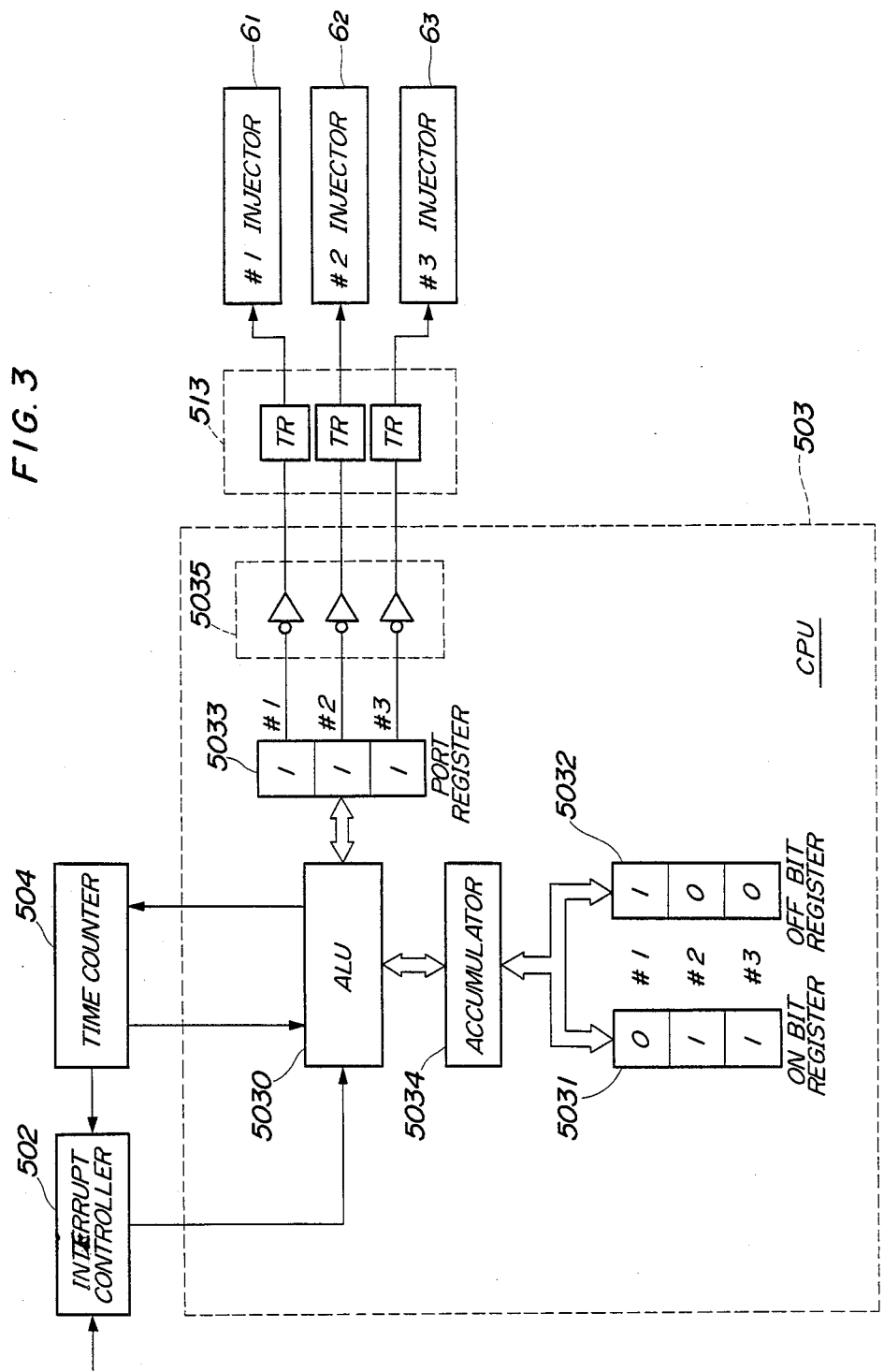
FIG. 3 is a schematic block diagram showing the detailed construction of a part appearing in FIG. 2.

FIG. 3 shows the interior construction of the CPU 503 and the driving circuit 513 shown in FIG. 2 as well as circuits connected thereto. The CPU 503 comprises an arithmetic and logic unit (hereinafter called "the ALU") 5030, an injector-on-bit register 5031 and an injector-off-bit register 5032, both connected to the ALU 5030 by way of an accumulator 5034, an injector port register 5033 connected to the ALU 5030 and having the same number of bits as that of cylinders of the engine, and an inverter circuit 5035 having inverter elements each corresponding to respective bits of the injector port register 5033.

The injector-on-bit register 5031 and the injector-off-bit register 5032 each comprise a ring counter having the same number of bits (3 bits) as that of the cylinders. More specifically; in the injector-on-bit register 5031, only one bit indicates a value of 0, and the rest indicate a value of 1. In response to each control pulse from the ALU 5030, the value of 0 moves to an adjacent bit in the order of #1, #2, #3, #1, . . . , i.e., thus the injector-on-bit register 5031 is updated. In the injector-off-bit register 5032, only one bit indicates a value of 1, and the rest indicate a value of 0. In response to each control pulse from the ALU 5030, the value of 1 moves to an adjacent bit in the order of #1, #2, #3, #1, . . . , i.e., thus the injector-off-bit 5032 is updated.

An output from each bit of the injector port register 5033 is inverted at the inverter circuit 5035, and then supplied to a corresponding transistor circuit TR of the driving circuit 513, to thereby control the commencement and termination of fuel injection from injectors $6_1$–$6_3$.

Figure 4:
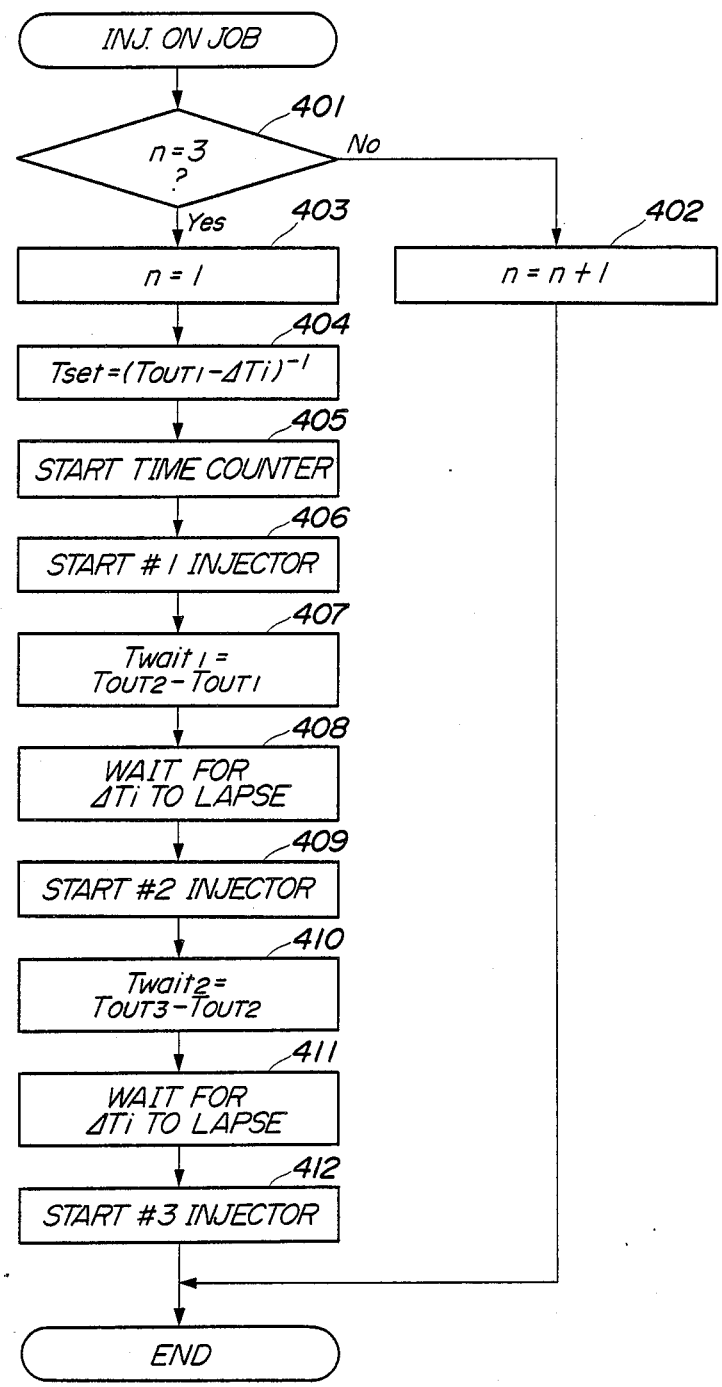
FIG. 4 is a flowchart of a control program for controlling the beginning of fuel injection by fuel injection valves according to the invention.

FIGS. 4 and 5 show an example of the fuel supply control program for affecting simultaneous injection, according to the method of the invention. The flowcharts of these figures will be described below, by referring to the timing chart in FIG. 6.

The program of FIG. 4 controls selection of an injector 6 to start injecting and the start timing of energizing (opening) the selected injectors 6. This control program is executed whenever each TDC signal pulse is inputted to the ECU and immediately upon completion of calculation of the fuel injection period $T_{OUT1}$–$T_{OUT3}$ for each injector 6 which calculation is started at the time of inputting the TDC signal pulse, when it is determined that the engine 1 is in an operating condition to effect simultaneous injection, such as a high speed operating condition and a high load operating condition.

First, it is determined at a step 401 whether or not a control variable n is equal to 3. The control variable n is for discriminating the #1 injector, which is set to 3 when the first TDC signal pulse is generated after generation of a CYL signal pulse. If the answer to the question of step 401 is negative (No), that is, if the control variable n is not equal to 3, the control variable n is increased by 1 at a step 402, and then the program is terminated.

If the answer to the question of step 401 is affirmative (Yes), that is, if the control variable n reaches 3, the control variable n is reset to 1 at a step 403, followed by steps 404 et seq. for affecting the simultaneous injection. As seen from the steps 401, 402 and 403, the simultaneous injection is effected every generation of three TDC signal pulses in the present embodiment [(b) and (d) of FIG. 6]. Then, a step 404 calculates the difference ($T_{OUT1}$–$\Delta Ti$) between the fuel injection period $T_{OUT1}$ calculated for the #1 injector $6_1$ and a predetermined period of time $\Delta Ti$, described later, and also sets a complement $(T_{OUT1}-\Delta Ti)^{-1}$ of the calculated difference to the set value Tset for the time counter 504 to count, followed by starting the time counter 504 counting from the set value Tset at a step 405 [(e) of FIG. 6]. Then, the program proceeds to a step 406. At step 406, the CPU 503 supplies a control signal to the driving circuit 513 to energize or open the #1 injector $6_1$ and thereby start fuel injection therethrough [(d)(1) of FIG. 6].

The predetermined period of time $\Delta Ti$ is set at a value slightly larger than the maximum value of the interrupt inhibit interval set by the CPU 503. Further, the reason why the time counter 504 is set as the set value Tset to the complement of the difference between the fuel injection period $T_{OUT}$ and the predetermined period of time $\Delta Ti$ is that the time counter 504 is an up counter as previously stated.

Next, at step 407, the difference between the #2 fuel injection period $T_{OUT2}$ and the #1 fuel injection period $T_{OUT1}$ is calculated, and the calculated difference is set to a first timer set waiting term Twait1, followed by waiting for the lapse of the predetermined period of time $\Delta Ti$ from the time the #1 injector $6_1$ started injecting, at a step 408. When the predetermined period of time $\Delta Ti$ has elapsed from the start of injection by the #1 injector $6_1$, the #2 injector $6_2$ is started to inject fuel at a step 409 [(d)(2) of FIG. 6].

Then, at a step 410, the difference between the #3 fuel injection period $T_{OUT3}$ and the #2 fuel injection period $T_{OUT2}$ is calculated, and the calculated difference is set to a second timer set waiting term Twait2, followed by waiting for the lapse of the predetermined period of time $\Delta Ti$ from the time the #2 injector 62 started injecting, at a step 411. When the predetermined period of time $\Delta Ti$ has elapsed from the start of injection by the #2 injector $6_2$, the #3 injector $6_3$ is started to inject fuel [(d)(3) of FIG. 6], and then the program terminates.

The steps 406, 409, and 412 in FIG. 4 will be further described in detail with reference to FIG. 3. These steps are each executed by supplying a control pulse from the ALU to the injector-on-bit register 5031.

In response to the control pulse, the injector-on-bit register 5031 is updated, and at the same time the ALU 5030 executes AND operation of the values respectively indicated by the bits of the injector-on-bit register 5031 and the values indicated by corresponding bits of the injector port register 5033 and rewrites the bits of the injector port register 5033 in accordance with the results of the AND operation.

At the step 406, in response to a control pulse from the ALU, the injector-on-bit register 5031 is updated so that #1 bit thereof indicates a value of 0. At this point of time, the bits of the injector port register 5033 are initialized so that they indicate a value of 1 since none of the injectors 6 are executing fuel injection. More specifically, since the bits of the injector-on-bit register 5031 indicate values of (0,1,1) (the values indicate the values of #1, #2, and #3 bits, respectively; the same applies correspondingly to the following), and the bits of the injector port register 5033 indicate values of (1,1,1), AND of these two sets of values is (0,1,1), so that the bits of the injector port register 5033 are rewritten as (0,1,1). The output of each bit of the injector port register 5033 is inverted at the inverter circuit 5035, and a signal of (1,0,0) is supplied to the driving circuit 513, whereby only a transistor circuit TR corresponding to #1 bit of the injector port register 5033 is energized to open only the valve of #1 injector $6_1$ and keep same in the open state.

Next, when step 409 is executed, in response to a control pulse from the ALU, the injector-on-bit register 5031 is updated, and the bits thereof indicate values of (1,0,1). At this point of time, the injector port register 5033 indicates values of (0,1,1). Therefore, AND of these two sets of values is (0,0,1), so that the bits of the injector port register 5033 are rewritten as (0,0,1). Accordingly, in addition to #1 injector $6_1$, #2 injector $6_2$ has its valve opened.

Next, when step 412 is executed, in response to a control pulse from the ALU, the injector-on-bit register 5031 is updated, and the bits thereof indicate values of (1,1,0). At this point of time, the injector port register 5033 indicates values of (0,0,1). Therefore, AND of these two sets of values is (0,0,0), so that the bits of the injector port register 5033 are rewritten as (0,0,0). Accordingly, all the valves of #1–#3 injectors $6_1$–$6_3$ are opened.

The program of FIG. 5 controls termination timing of energizing or closing the injectors 6, which is executed in response to generation of the interrupt signal which is outputted from the interrupt control circuit 502 when the count of the time counter 504 reaches the overflow count value Tof. More specifically, if the time counter 504 counts up at a time other than the interrupt inhibit interval, the control program in FIG. 5 is executed immediately upon counting-up of the time counter 504. On the other hand, if the time counter 504 overflows within the interrupt inhibit interval, the control program is executed immediately upon termination of the interrupt inhibit interval [(c)(e) of FIG. 6].

First, let it be assumed that the FIG. 5 control program is executed for the first time after a simultaneous injection has been started by execution of the FIG. 4 control program, such a program execution loop being hereinafter called "the first loop".

A count value Tread which the time counter 504 currently indicates is read at a step 501. The count value Tread represents a current count value of the time counter 504 which increases from zero to which the counter 504 is reset upon counting-up, that is, in the first loop, elapsed time after the counting-up of the time counter 504 which has been counting the energizing period of time of the #1 injector $6_1$ [(e) of FIG. 6].

At a step 502, it is determined whether or not the count value Tread read in step 501 is larger than the predetermined period of time $\Delta Ti$. If the answer is No, that is, if the predetermined period of time $\Delta Ti$ does not yet elapse after the counting-up of the time counter 504 (Tread > $\Delta Ti$), the program returns to the step 501. Then, execution of the steps 501, 502 is repeated until the answer to step 502 is Yes.

On the other hand, if the answer to the question at step 502 is Yes, that is, if the predetermined period of time $\Delta Ti$ has elapsed after the counting-up of the time counter 504 (Tread > $\Delta Ti$), the program proceeds to a step 503, wherein the injector-off-bit register 5032 is updated with respect to a bit thereof corresponding to an injector 6 which is to terminate fuel injection in the present loop. The first updating is effected in such a manner that a value of 1 is assumed by a corresponding bit of the injector-off-bit register 5032 which corresponds to the earliest injector 6 that has started to inject fuel. That is, since the #1 injector $6_1$ is the earliest injector in the first loop, the value of 1 is assumed by the #1 bit of the injector-off-bit register 5032 which corresponds to the #1 injector $6_1$. Thereafter, the injector-off-bit register 5032 is sequentially updated in the order of #2 bit, #3 bit, #1 bit . . . whenever the control program in FIG. 5 is executed.

Next, at a step 504, the ALU 5030 executes OR operation of values indicated by the bits of the injector-off-bit register 5032 and values indicated by the bits of the injector port register 5033 corresponding to the bits of the injector-off-bit register 5032, to thereby rewrite the bits of the injector port register 5033 in accordance with the results of the OR operation. The output from each of the bits of the injector port register 5033 is inverted at the inverter circuit 5035 and then supplied to the driving circuit 513 to thereby stop fuel injection from a corresponding injector [(d) of FIG. 6].

In the first loop, at step 503, #1 bit of the injector-off-bit register 5032 indicates a value of 1, i.e., the bits of the injector-off-bit register 5032 indicate values of (1,0,0). In the meanwhile, the bits of the injector port register 5033 after step 412 in FIG. 4 being executed indicate values of (0,0,0). Therefore, OR operation of these two sets of values gives a set of values of (1,0,0), so that the bits of the injector port register 5033 are rewritten as (1,0,0). Accordingly, an output of each bit of the injector port register 5033 is inverted at the inverter circuit 5035, and a signal of (0,1,1) is supplied to the driving circuit 513, whereby only the transistor circuit TR corresponding to #1 bit of the injector port register 5033 is energized to thereby close the valve of #1 injector $6_1$ [(d)(1) of FIG. 6].

Figure 6:
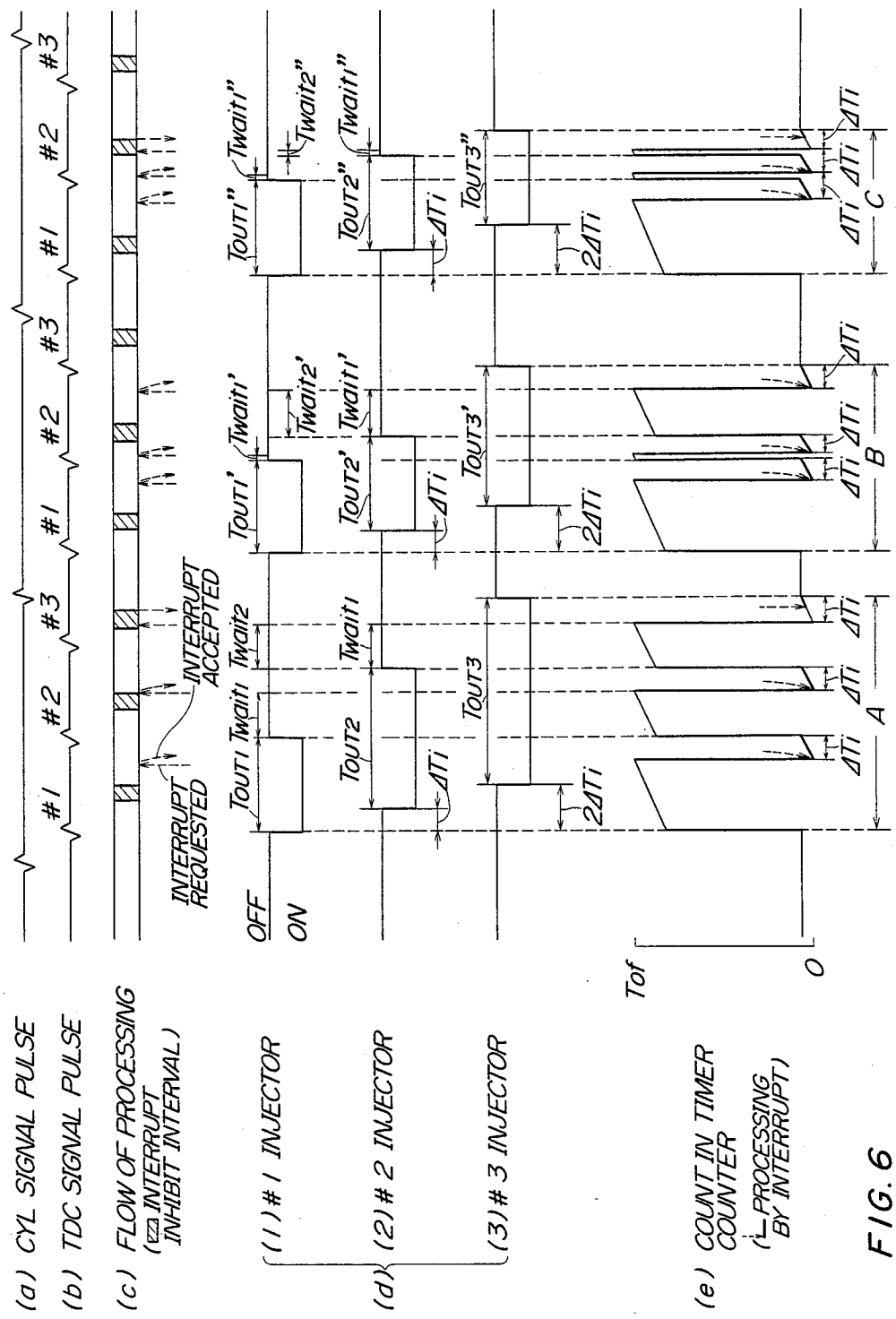
FIGS. 6 (a–e) show a timing chart of fuel injection timing, operating timing of a time counter, etc.

Next, at a step 505, the operation of the time counter 504 is stopped [(e) of FIG. 6], and then the program proceeds to a step 506 in which it is determined whether or not all the bits of the injector port register 5033 assume a value of 1, that is, whether or not all the injectors 6 are not injecting fuel. Since the #2 and #3 injectors $6_2$, $6_3$ are currently injecting fuel in the first loop, the answer to the question of the step 506 should be No, which makes the program proceed to a step 507.

At the step 507, the time counter 504 has its set value Tset set to the complement of the first timer set waiting term Twait1 set in the step 407 shown in FIG. 4, i.e. $(T_{OUT2}-T_{OUT1})^{-1}$, followed by starting the time counter 504 to count from the set value Tset at a step 508 [(e) of FIG. 6]. Then at a step 509, the first timer set waiting term Twait1 is set to the second timer set waiting term Twait2 set in the step 410 in FIG. 4, i.e. $(T_{OUT3}-T_{OUT2})$, and then the program terminates.

As stated above, the #1 injector $6_1$ is controlled to close or stop energization in the first loop of the control program of FIG. 5, such that the fuel injection period of the #1 injector $6_1$ is the sum of a time period from the start of fuel injection of the #1 injector $6_1$ to the counting-up of the time counter 504, i.e. $(T_{OUT1}-\Delta Ti)$ which has been set into the time counter 504 in the step 404 in FIG. 4, and a time period from the counting-up of the time counter 504 to the termination of fuel injection of the #1 injector $6_1$, i.e. the predetermined period of time $\Delta Ti$, to thereby control the injection period of #1 injector $6_1$ to the desired or calculated fuel injection period $T_{OUT1}$.

When the time counter 504 has counted up, which has been started in the step 508 from the set value Tset set in the step 507 of the first loop, the interrupt signal is generated, in response to the control program of FIG. 5 is again executed. This execution of the control program of FIG. 5 is the second one after the current simultaneous injection, this program execution loop being hereinafter called "the second loop".

In the second loop, first, the steps 501 and 502 are executed. If the answer to the question of step 502 is Yes, that is, if the predetermined period of time $\Delta Ti$ has elapsed after the counting-up of the time counter 504, #2 bit of the injector-off-bit register 5032 is updated to a value of 1 (step 503), and then at step 504, since the bits of the updated injector-off-bit register 5032 indicate values of (0,1,0), and on the other hand the bits of the injector port register 5033 which have been rewritten at step 504 in the first loop indicate values of (1,0,0), OR operation of these two sets of values gives a set of value of (1,1,0), so that the bits of the injector port register 5033 are rewritten as (1,1,0). Accordingly, in addition to #1 injector $6_1$, #2 injector $6_2$ has its valve closed [(d)(2) of FIG. 6].

Next, the counting of the time counter 504 is stopped at the step 505 [(e) of FIG. 6], and then the program proceeds to the step 506. Since the #3 injector $6_3$ is currently injecting fuel in the second loop, the answer to the question of step 506 should be No, and then the program proceeds to step 507.

At the step 507, the time counter 504 has its set value Tset set to the complement of the second timer set waiting term Twait2 set in the step 410 in FIG. 4, and thereafter shifted from the second one Twait2 in the step 509 of the first loop, i.e. $(T_{OUT3}-T_{OUT2})^{-1}$, followed by starting the time counter 504 to count from the set value Tset at step 508 [(e) of FIG. 6]. Further, the step 509 is executed, and then the program terminates.

As stated above, the #2 injector $6_2$ is controlled to close or stop energization in the second loop of the control program of FIG. 5, such that the fuel injection period for the #2 injector $6_2$ is the sum of a time period from the start of fuel injection of the #2 injector $6_2$ to the start of counting in the time counter 504 executed in the step 508 of the first loop, i.e. $(T_{OUT1}-\Delta Ti)$, a time period from the start of counting in the time counter 504 to the counting-up of the time counter 504, i.e. $T_{OUT2}-T_{OUT1}$ set to the time counter 504 in the step 507 of the first loop, and a time period from the counting-up of the time counter 504 to the termination of fuel injection by the #2 injector $6_2$, i.e. the predetermined period of time $\Delta Ti$, to thereby enable the #2 injector $6_2$ to inject over the desired or calculated fuel injection period $T_{OUT2}$.

When the count of the time counter 504 has counted up, which has been started in the step 508 of the second loop, the interrupt signal is generated, in response to which the control program of FIG. 5 is again executed. This program execution loop will be hereinafter called "the third loop".

In the third loop, first, the steps 501 and 502 are executed. If the answer to the question of step 502 is Yes, that is, if the predetermined period of time $\Delta Ti$ has elapsed after the counting-up of the time counter 504, #3 bit of the injector-off-bit 5032 is updated to a value of 1, and then at step 504, since the bits of the updated injector-off-bit register 5032 indicate values of (0,0,1), and on the other hand the bits of the injector port register 5033 which have been rewritten at step 504 in the second loop indicate values of (1,1,0), OR operation of these two sets of values gives a set of value of (1,1,1), so that the bits of the injector port register 5033 are rewritten as (1,1,1). Accordingly, all the valves of #1–#3 injectors $6_1$–$6_3$ are closed [(d)(3) of FIG. 6].

Next, the counting of the time counter 504 is stopped at the step 505 [(e) of FIG. 6], and then the program proceeds to the step 506. Since none of the injector 6 have been injecting after termination of fuel injection by the #3 injector 6₃ in the third loop, the answer to the question of step 506 should be Yes, and then the program terminates.

As stated above, the #3 injector 6₃ is controlled to close or stop energization in the third loop of the control program of FIG. 5, such that the fuel injection period of the #3 injector 6₃ is the sum of a time period from the start of fuel injection of the #3 injector 6₃ to the start of counting in the time counter 504 executed in the step 508 of the second loop, i.e. ($T_{OUT2}-\Delta Ti$, a time period from the start of counting in the time time counter 504 to the counting-up of time time counter 504, i.e. ($T_{OUT3}-T_{OUT2}$) which is set to the time counter 504 in the step 507 of the second loop, and a time period from the counting-up of the time counter 504 to the termination of fuel injection by the #3 injector 6₃, i.e. the predetermined period of time $\Delta Ti$, to thereby enable the #3 injector 6₃ to inject over the desired or calculated fuel injection period $T_{OUT3}$.

According to the embodiment of the invention described above, it is possible to accurately measure the fuel injection periods $T_{OUT1}-T_{OUT3}$ for the #1-#3 injectors, by means of the single time counter 504 when simultaneous injection is effected. Further, the invention is not applied only to the described embodiment in which the fuel injection periods $T_{OUT1}-T_{OUT3}$ for the injectors 61-63 are different from each other as shown in A of FIG. 6 ($T_{OUT1} < T_{OUT2} < T_{OUT3}$), but the invention can be also applied to other embodiments in which two or all of the fuel injection periods $T_{OUT1}-T_{OUT3}$ are substantially identical with each other as shown in B and C of FIG. 6 ($T_{OUT1}' \approx T_{OUT2}' < T_{OUT3}'$ or $T_{OUT1}'' \approx T_{OUT2}'' \approx T_{OUT3}''$).

Further, the fuel injection is terminated in each injector 6 when the predetermined period of time $\Delta Ti$ elapses after the count of the time counter 504 has counted up, and, as stated above, the predetermined period of time $\Delta Ti$ is set to a value larger than the maximum value of the interrupt inhibit interval in the CPU 503. Therefore, even though the time of counting-up of the time counter 504 falls within the interrupt inhibit interval, causing the interrupt signal to be supplied to the CPU 503, the interrupt predetermined period of time $\Delta Ti$ elapses, to thereby ensure execution of the control program in FIG. 5 without delay so that there occurs no delay in generation of the control signals for terminating fuel injections by the injectors 6, to thereby enable the injectors 6 to inject fuel for the respective desired fuel injection periods $T_{OUT}$.

Further, since this predetermined period of time $\Delta Ti$ is also used to provide a time difference in the start of fuel injection between injectors in the described embodiment, it can simplify the control program and reduce the memory capacity.

What is claimed is:

1. A fuel injection control method for an internal combustion engine having a plurality of cylinders, and a plurality of fuel injection valves associated, respectively, with said cylinders, wherein fuel injection is started through each of said fuel injection valves while a period of time elapsed from the start of fuel injection is counted by time counting means, and the fuel injection through each of said fuel injection valves is terminated in response to completion of counting of said time counting means, the method comprising the steps of:

(1) starting fuel injection through a first one of said fuel injection valves, and at the same time causing said time counting means to count a period of time elapsed from the start of fuel injection through said first one fuel injection valve;
   (2) starting fuel injection through a second one of said fuel injection valves when a predetermined period of time elapses after the start of fuel injection through said first one fuel injection valve;
   (3) terminating the fuel injection through said first one fuel injection valve in response to completion of counting of said time counting means started in said step (1), and at the same time setting a difference between a desired fuel injection period of time for said first one fuel injection valve and a desired fuel injection period of time for said second one fuel injection valve and restarting said time counting means to count said difference; and
   (4) terminating the fuel injection through said second one fuel injection valve in response to completion of counting of said time counting means restarted in said step (3).

2. A fuel injection control method as claimed in claim 1, wherein said time counting means comprises a single time counter.

3. A fuel injection control method as claimed in claim 1, wherein in said step (3) the fuel injection through said first one fuel injection valve is terminated when a second predetermined period of time has elapsed after said completion of counting of said time counting means.

4. A fuel injection control method as claimed in claim 1, wherein in said step (4) the fuel injection through said second one fuel injection valve is terminated when a second predetermined period of time has elapsed after said completion of counting of said time counting means restarted in said step (3).

5. A fuel injection control method as claimed in claim 3 or claim 4, wherein said second predetermined period of time is longer than a predetermined interrupt inhibiting period of time during which execution of fuel injection control is inhibited.

6. A fuel injection control method as claimed in claims 3 or 4, wherein said second predetermined period time is equal to said first-mentioned predetermined period of time.

7. A fuel injection control method as claimed in claim 5, wherein said second predetermined period of time is equal to said first mentioned predetermined period of time.

* * * * *